US 6,669,420 B2

(12) United States Patent
Ikuta

(10) Patent No.: US 6,669,420 B2
(45) Date of Patent: Dec. 30, 2003

(54) NUT ASSEMBLY INCLUDING FRAME HAVING A FLANGE PORTION AND OPPOSED ARMS SUPPORTING A PIVOTABLE NUT

(75) Inventor: Kazuichi Ikuta, Osaka (JP)

(73) Assignee: Wakai & Co., Ltd., Osaka (JP)

( * ) Notice: Subject to any disclaimer, the term of this patent is extended or adjusted under 35 U.S.C. 154(b) by 0 days.

(21) Appl. No.: 10/124,425

(22) Filed: Apr. 18, 2002

(65) Prior Publication Data

US 2002/0154965 A1 Oct. 24, 2002

(30) Foreign Application Priority Data

Apr. 19, 2001 (JP) ........................................ 2001-120680

(51) Int. Cl.[7] ................................................ F16B 21/00
(52) U.S. Cl. ...................................... 411/340; 411/427
(58) Field of Search ......................... 411/340–346, 427, 411/386; 206/338

(56) References Cited

U.S. PATENT DOCUMENTS 1,521,024 A * 12/1924 Hubener
6,272,814 B1 * 8/2001 Ikuta et al.

FOREIGN PATENT DOCUMENTS

| DE | 25 49 868 | 5/1976 |
| EP | 0 646 730 | 4/1995 |
| JP | 10-220448 | 8/1998 |
| WO | 86/06446 | 11/1986 |

* cited by examiner

Primary Examiner—Flemming Saether
(74) Attorney, Agent, or Firm—Wenderoth, Lind & Ponack, L.L.P.

(57) ABSTRACT

A nut assembly is proposed in which deformation will not occur at the end of a threaded hole formed in the nut and it is not necessary to give special consideration to the formation of female threads. A nut is pivotally and slidably mounted between opposed arms of a frame. A threaded hole is formed in the nut so as to extend therethrough, a ridge is integrally provided on the back side, and a hole is provided coaxially with the threaded hole. The hole has an inner diameter substantially equal to or greater than the root diameter of the female threads of the threaded hole.

3 Claims, 6 Drawing Sheets

NUT ASSEMBLY INCLUDING FRAME HAVING A FLANGE PORTION AND OPPOSED ARMS SUPPORTING A PIVOTABLE NUT

BACKGROUND OF THE INVENTION

This invention relates to a nut assembly used to fasten an instrument or the like to a member to the back of which hands cannot reach.

FIGS. 4A–6 show a conventional nut assembly used for such purpose. As shown in FIGS. 4A and 4B, the nut assembly 1 comprises a nut 5 having a threaded through hole 2 and pins 3 on both sides and formed at one end thereof with an inclined guide surface 4 for pivoting the nut when pushed by a bolt A, and a frame 9 having a pair of opposed arms 8 provided on both sides of a flange portion 7 having a bolt hole 6 at the center. By supporting the pins 3 in elongated holes 10 formed in the arms 8, the nut 5 is mounted between the opposed arms 8 so as to pivot about the pins 13) 3 and to be slidable in and along the elongated holes 10.

Lugs 11 are provided on both sides of the nut 5 so that with the pins 3 positioned at the tips of the elongated holes 10, the nut 5 can turn only 90 degrees in one direction from the position in which the longitudinal direction of the nut 5 is aligned with the longitudinal direction of the arms 8 and can slide along the elongated holes 10 from the position in which the longitudinal direction of the nut 5 is perpendicular to the longitudinal direction of the arms 8. Further, at the tips of the arms 8, lugs 12 are provided which are adapted to engage the lugs 11 when the longitudinal direction of the nut 5 is aligned with the longitudinal direction of the arms 8.

The flange portion 7 of the frame 9 is rectangularly shaped. Around the bolt hole 6 in the flange portion 7, a bolt guide wall 13 for axially guiding a bolt A inserted through the bolt hole 6 is provided so that the bolt will be reliably threaded into the threaded hole 2.

The nut 5 has on its back side a ridge 14 having an apex extending in the longitudinal direction, and has a threaded hole which extends therethrough in substantially the center thereof. The side of the threaded hole 2 into which the bolt A penetrates is formed into a tapered guide hole 15 so that the bolt A can easily penetrate into the threaded hole 2. The open end of the guide hole 15 has such an inner diameter that the bolt guide wall 13 fits therein.

Thus, the inner diameter of the threaded hole 2 is uniform from the guide hole 15 to its end where it opens at the ridge 14 on the back side.

FIG. 6 shows the conventional nut assembly 1 inserted into a hole D formed in the member B. It shows how an instrument C is fastened to the member B by means of a bolt A tightened into the nut assembly 1. As shown in FIG. 6, the nut assembly 1 is inserted into the hole D with the nut 5 first and further pushed in until the flange portion 7 abuts the surface of the member B. With an instrument C superposed on the flange portion 7 of the nut assembly 1, the bolt A is inserted into a hole E of the instrument C while pushing the inclined guide surface 4 of the nut 5 with the tip of the bolt, thereby turning the nut 5 by 90°. The tip of the bolt is guided into a tapered guide surface 15 of the nut 5 so as to threadedly engage female threads of the threaded hole 2. When the bolt is turned further, the nut 5 is pulled close. The mounting is now complete.

As shown in FIGS. 5A and 5B, in this conventional nut assembly 1, since the nut 5 has a horse-saddle shaped ridge 14 on its back side, the last thread of the threaded hole 2 at the ridge 14 is defined as a partially missing incomplete circle. Thus, if female threads 2a are formed by tapping on the inner periphery of the hole 2, incomplete female threads will be formed at the end.

In particular, some of the female threads 2a near the end tend to be shaped into independent small ribs as shown in FIG. 5B.

In the manufacturing steps of such nuts 5, after formation of the female threads 2a, the nuts are generally subjected to polishing or plating. In these steps, the nuts 5 collide against each other, so that the ridge 14 on the back of each nut collides against the edge portions of other nuts 5. When the edges of other nuts collide against the end of the threaded hole 2, small ribs of the female threads 2a formed in the previous step are liable to be deformed.

This is because the ridge 14 has a shape similar to a horse saddle and the threaded hole 2, formed in it, is completely unprotected against deformation.

If small threads are deformed, when the bolt A is threaded and its tip is about to protrude to the back side, the male threads of the bolt A and the deformed portions of the female threads 2a will engage, so that the bolt A will be unable to advance.

Since ordinary nuts can be rigidly held by hand or tool, deformation of such a degree poses no practical problems in many cases. But with the nut to which this invention is directed, if meshing occurs with the nut simply supported by the arms 8 extending from the flange 7 of the frame 9 in a hollow portion to which hands cannot reach, even such a slight meshing causes the nut 5 to be turned together with the bolt A. The arms 8 may thus be broken.

Thus, it was required to form female threads of a size slightly larger to allow slight deformation of the threads at the end of the threaded hole, or a high degree of quality control was required.

An object of this invention is therefore to provide a nut assembly in which the open end of the threaded hole formed in the nut at the ridge formed on the back side is a complete circle so that since due to protection against external shocks, deformation will not occur at the end of the female threads during polishing or plating, no special consideration is needed in the formation of female threads.

SUMMARY OF THE INVENTION

According to this invention, there is provided a nut assembly comprising a pivotable nut having a threaded through hole and a pin on each side thereof, and a frame having a flange portion formed with a bolt hole and an opposed pair of arms extending from both sides of the flange portion, the arms each being formed with an elongated hole, the nut being formed at one end thereof with an inclined guide surface for pivoting the nut when pushed by a bolt, the nut being pivotably and slidably mounted between the arms with the pins received in the elongated holes formed in the arms, characterized in that the nut is of an elongated cubic shape, is formed with a threaded hole which extends therethrough substantially in the center thereof from one of its longitudinal sides toward its back side, and is integrally formed on the back side with a ridge, and that a hole is provided coaxially with the threaded hole where one end of the threaded hole opens at the ridge, the hole having an inner diameter substantially equal to or greater than the root diameter of the female threads formed in the threaded hole.

In this invention, since the hole provided in the ridge has an inner diameter substantially equal to or greater than the root diameter of the female threads of the threaded hole, female threads are scarcely formed in the hole provided in the ridge. At the boundary between the hole, which is an incomplete circle, and the end of the threaded hole, which is a complete circle, a tapered surface can be formed.

The bolt penetrating side of the threaded hole is formed into a tapered guide surface so that the bolt can easily advance into the threaded hole.

Other features and objects of the present invention will become apparent from the following description made with reference to the accompanying drawings, in which:

DETAILED DESCRIPTION OF THE PREFERRED EMBODIMENT

Hereinbelow, the embodiment of this invention will be described with reference to the accompanying drawings. Since the basic structure of the nut assembly is the same as the one described in the prior art section based on FIGS. 4A–6, the same symbols are attached to the same parts and only the essential matter of this invention will be described below.

Figure 1A:
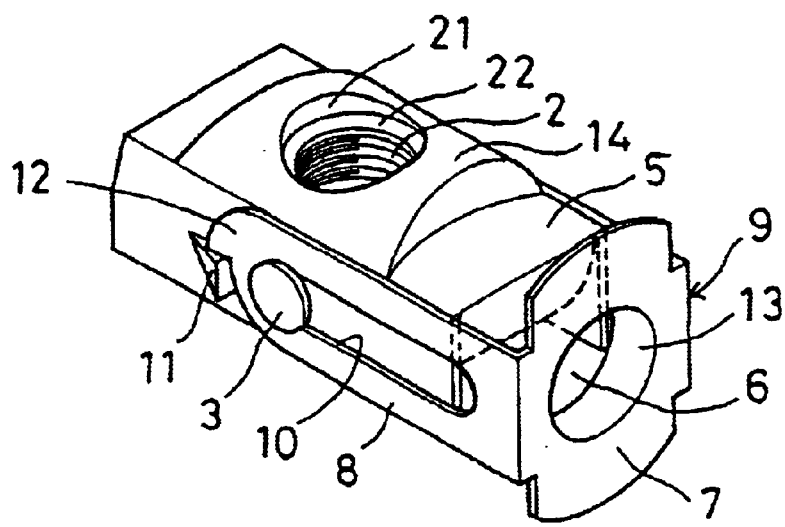
FIG. 1A is a perspective view showing a nut assembly of this invention.
Figure 1B:
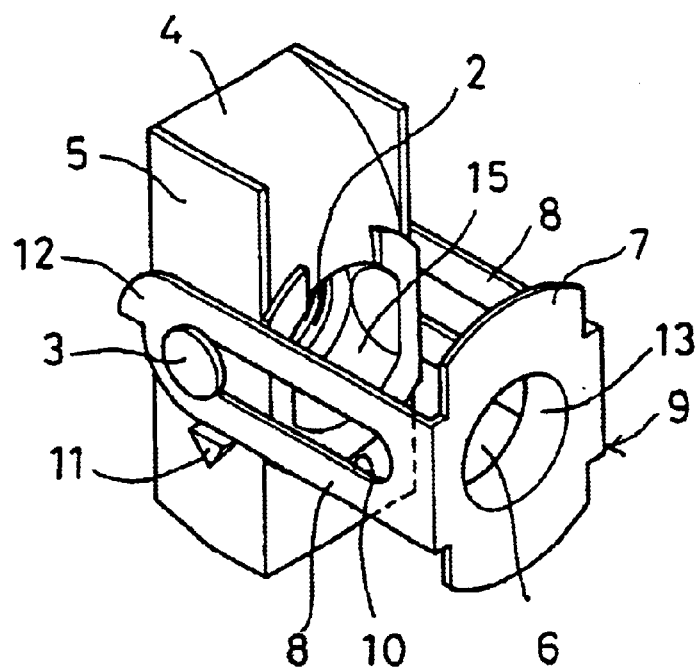
FIG. 1B is a perspective view showing the same nut assembly in which the nut is turned 90° from the state of FIG. 1A.
Figure 2A:
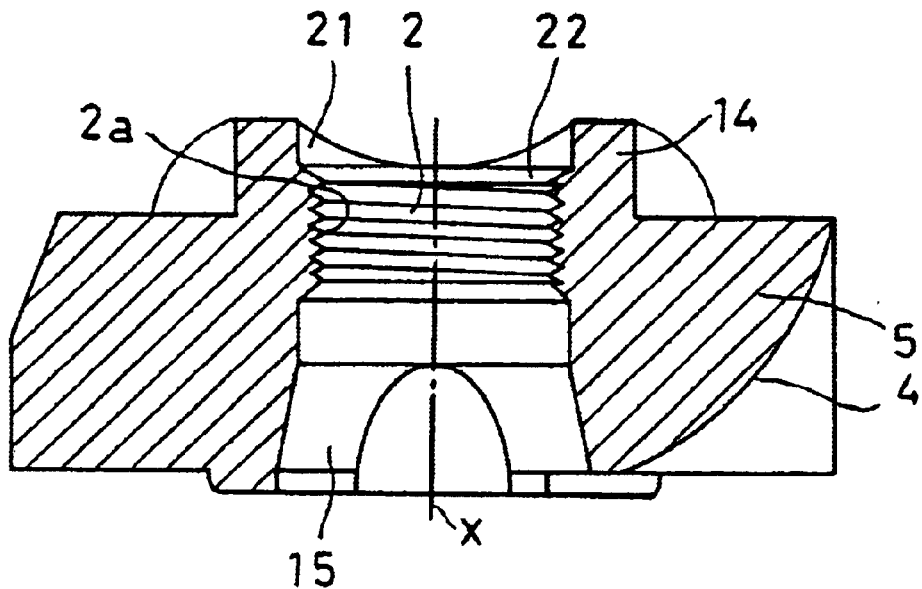
FIG. 2A is a vertical sectional front view of the nut of the nut assembly of this invention.
Figure 2B:
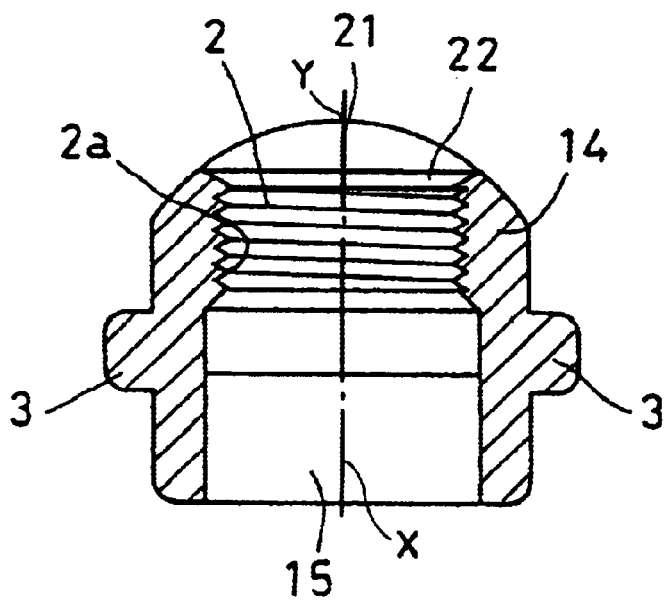
FIG. 2B is a vertical sectional side view of the same.

As shown in FIGS. 1A and 1B, the nut 5 of the nut assembly 1 of this invention is of an elongated cubic shape and has a threaded hole 2 extending therethrough in substantially the center from one of the longitudinal surfaces toward its back side. On its back side, a ridge 14 having a shape like a horse saddle is integrally formed. A thread-free hole 21 is provided coaxially with the threaded hole 2 at a position where one end of the threaded hole opens. The hole 21 has an inner diameter substantially equal to or greater than the root diameter of the female threads 2a of the threaded hole 2. As shown in FIG. 2A, the internal walls of the thread-free hole 21 are preferably parallel with colinear axes X of the holes 2 and 21. As shown in FIG. 2B, the axes X intersect the apex Y of the ridge 14.

As shown in FIG. 2A, the hole 21 provided in the ridge 14 is an incomplete circle whereas the end of the threaded hole 2 at the boundary between the hole 21 and the threaded hole 2 is a complete circle.

By forming the hole 21 so that its inner diameter is substantially equal to or greater than the root diameter of the female threads 2a of the threaded hole 2, when the female threads 2a are formed by tapping, no female threads 2a will be formed in the hole 21 provided in the ridge 14. At the boundary between the hole 21, which is an incomplete circle, and the end of the threaded hole 2, which is a complete circle, a tapered surface 22 may be formed.

The bolt penetrating side of the threaded hole 2 of the nut 5 is formed into a circular tapered guide hole 15 so that the bolt A can easily penetrate into the threaded hole 2.

The nut assembly of this invention is structured as described above. By providing the thread-free hole 21 at a position where the end of the threaded hole 2 opens at the ridge 14 of the nut 5, and forming the inner diameter of the hole 21 substantially equal to or greater than the root diameter of the female threads 2a of the threaded hole 2, the end of the threaded hole 2 provided in the nut at the ridge 14 on the back becomes a complete circle. Thus, it is possible to protect the end of the threaded hole 2 against shocks from outside. Also, deformation will not occur at the end of the female threads 2a during polishing or plating. Thus it is not necessary to give special consideration during the formation of the female threads 2a.

Figure 3:
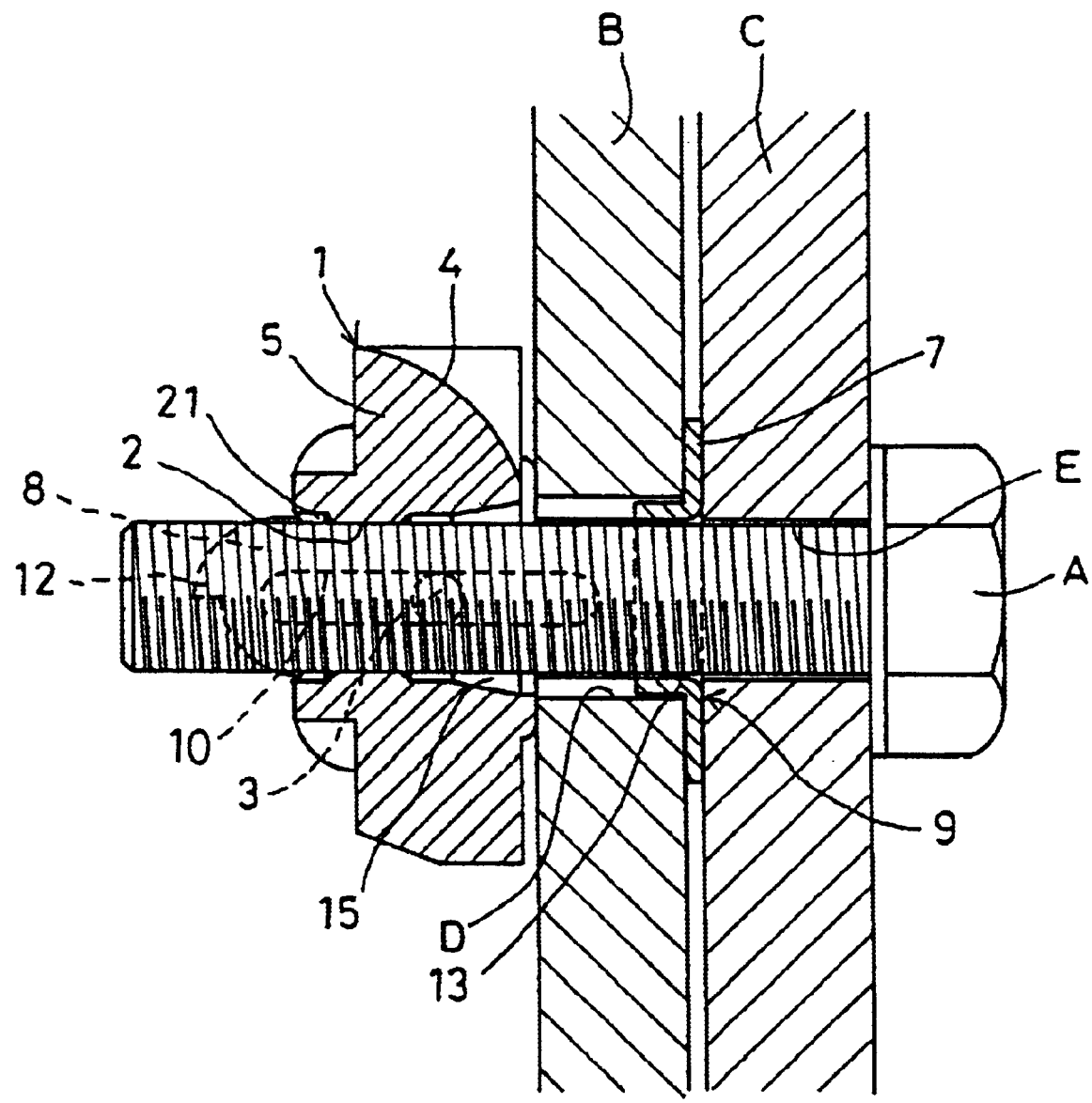
FIG. 3 is a vertical sectional view showing how a member is clamped with the nut assembly of this invention.
Figure 4A:
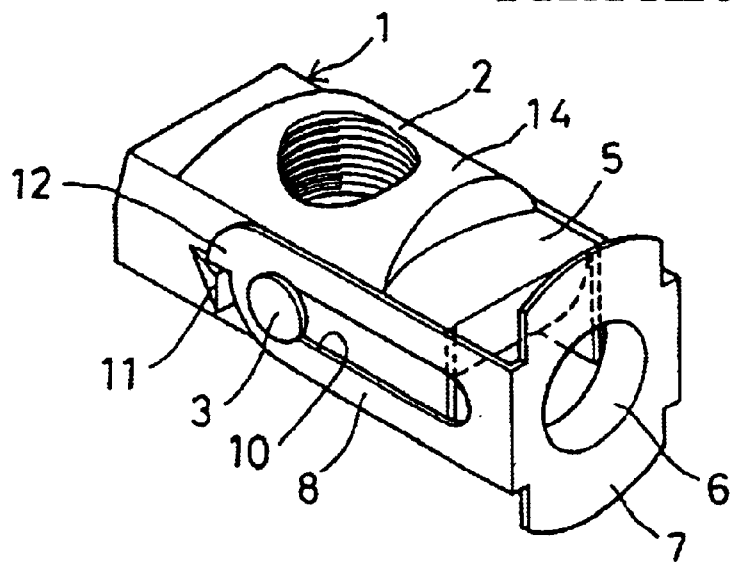
FIG. 4A is a perspective view showing a conventional nut assembly.
Figure 4B:
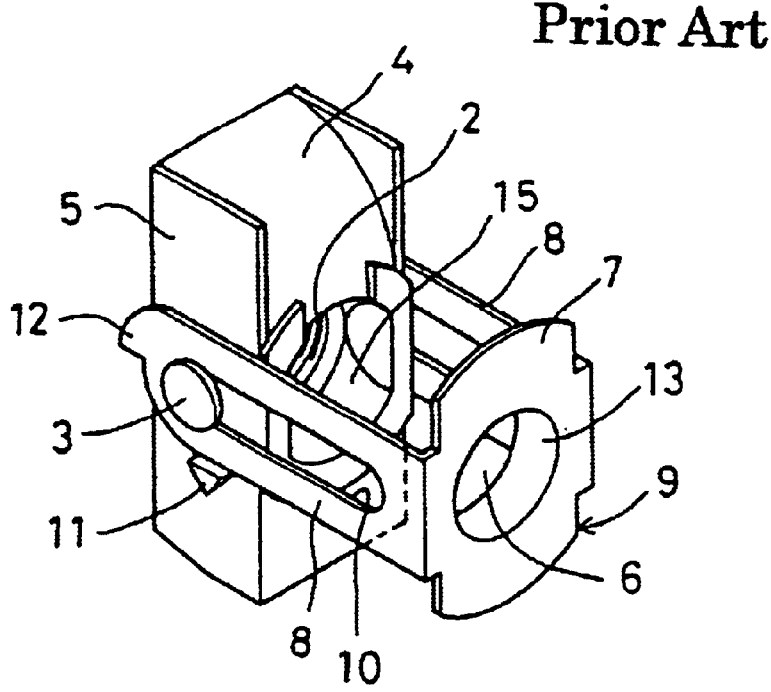
FIG. 4B is a perspective view showing the same nut assembly in which the nut is turned 90° from the state of FIG. 4A.
Figure 5A:
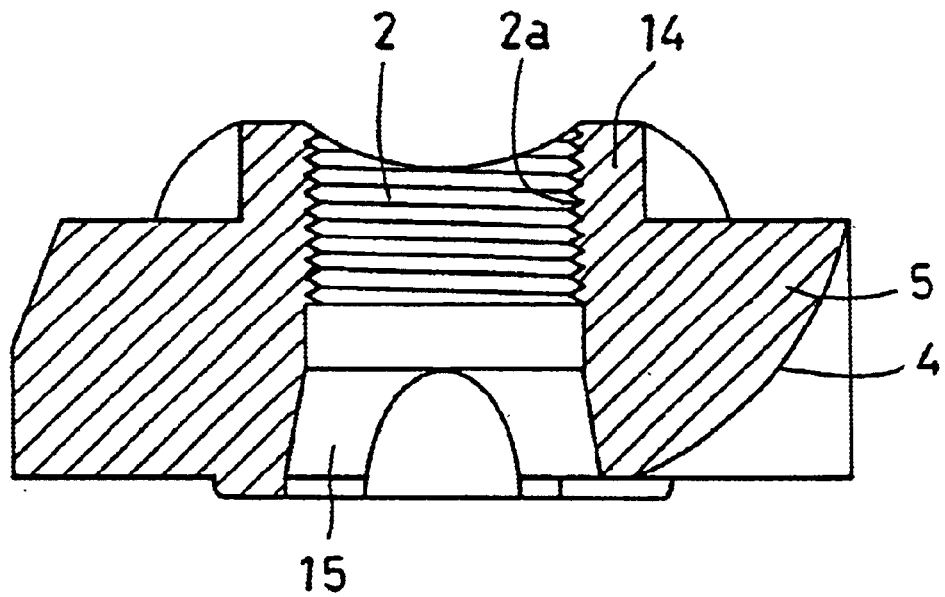
FIG. 5A is a vertical sectional front view showing the nut of the conventional nut assembly.
Figure 5B:
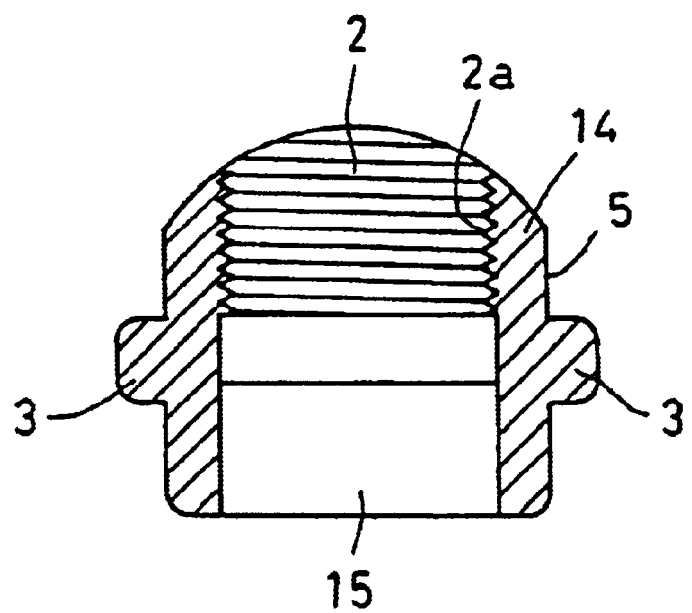
FIG. 5B is a vertical sectional side view of the same.
Figure 6:
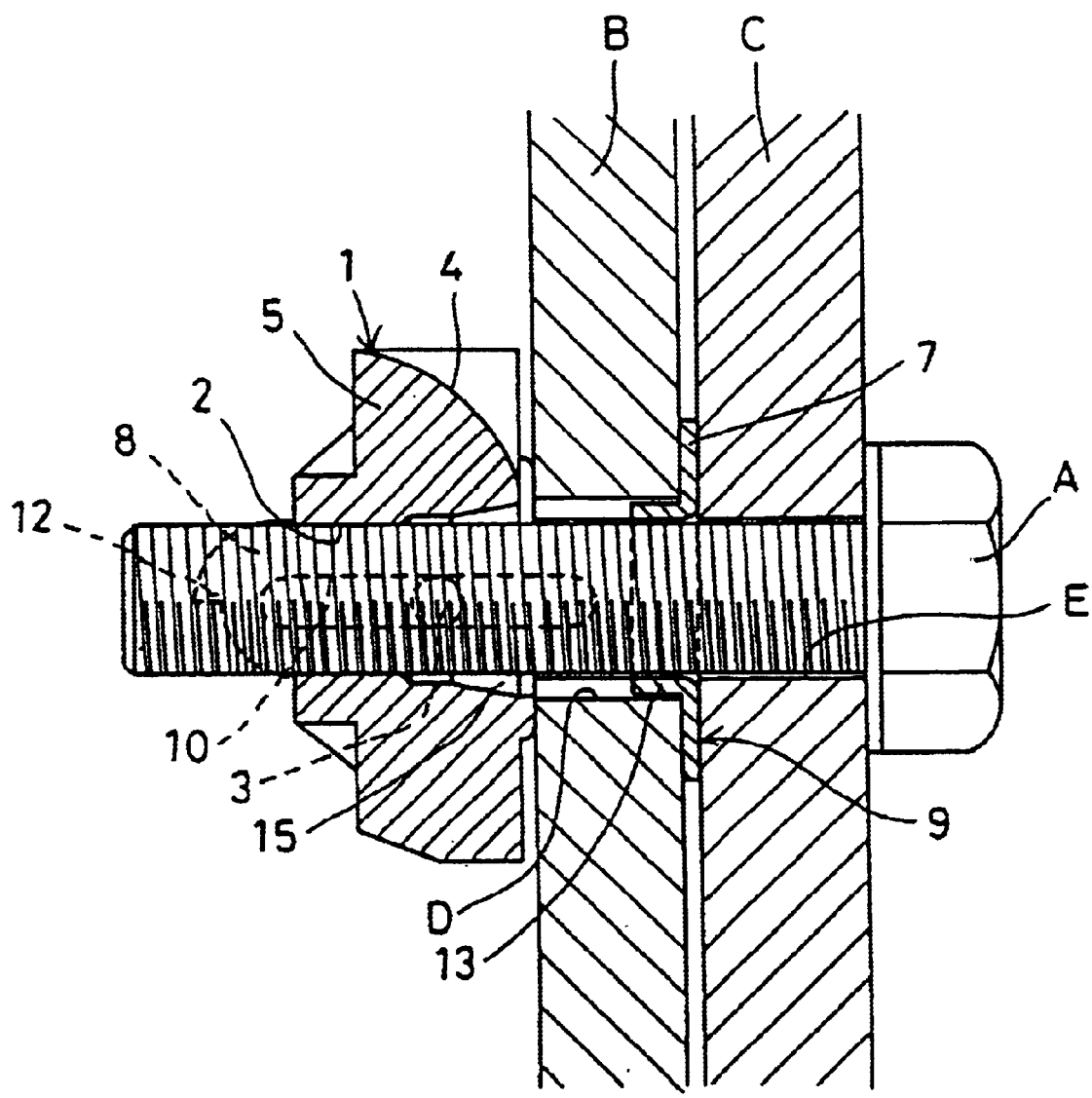
FIG. 6 is a vertical sectional view showing how a member is clamped by use of the conventional nut assembly.

Also, as shown in FIG. 3, in the female threads 2a of the threaded hole 2, no deformation of the threads at the open end at the ridge 14 will occur. Thus, there is no factor that increases resistance when the bolt A is threaded and is about to protrude toward the back side, so that the bolt will advance smoothly in the threaded hole 2. This prevents the nut 5 from being turned together with the bolt A, so that the arms will not be broken. Thus, reliable and positive fixing of the tool C to the member B with the bolt A are possible.

According to this invention, since the ridge having its apex extending in the longitudinal direction of the nut is integrally provided on the back side of the nut, and the open hole is provided coaxially with the threaded hole at the position where the end of the threaded hole opens at the ridge so that the inner diameter of the open hole is substantially equal to or greater than the root diameter of the female threads of the threaded hole, the open end of the threaded hole provided in the nut at the ridge on the back becomes a complete circle. Furthermore, by recessing the open end of the threaded hole from the outer surface of the ridge, the end of the threaded hole is protected against shock from outside. Thus no deformation will occur at the end of the female threads during polishing or plating. Also it is not necessary to give special consideration to the formation of the female threads, and a high degree of quality control is not necessary. Thus, manufacture of the nut assembly is easy.

Also, since no deformation occurs at the end of the female threads, the bolt advances smoothly in the threaded hole. This prevents the nut from being turned together with the bolt and the arms from being broken. Thus, a member can be reliably clamped by a bolt.

What is claimed is:

1. A nut assembly comprising a pivotable nut having a threaded through hole and a pin on each side thereof, and a frame having a flange portion formed with a bolt hole and an opposed pair of arms extending from both sides of said flange portion, said arms each being formed with an elongated hole, said nut being formed at one end thereof with an inclined guide surface for pivoting said nut when pushed by a bolt, said nut being pivotably and slidably mounted between said arms with said pins received in said elongated holes formed in said arms, wherein said nut is of a longitudinally elongated cubic shape, is formed with the threaded hole extending therethrough substantially in a center thereof from one of its longitudinal sides toward its back side, and is integrally formed on said back side with a ridge having a longitudinally extending apex, and that a non-threaded hole is provided coaxially with said threaded hole where one end of said threaded hole opens at said ridge, said non-threaded hole having an inner diameter substantially equal to or greater than the root diameter of female threads formed in said threaded hole, said threaded hole and said non-threaded hole having colinear axes that intersect said longitudinally extending apex.

2. A nut assembly according to claim 1, wherein internal sidewalls of said non-threaded hole are parallel with said colinear axes.

3. A nut assembly according to claim 1, wherein said non-threaded hole comprises a cylindrical hole.

* * * * *